June 6, 1933.  E. C. FRITTS  1,912,700
APPARATUS FOR PHOTOGRAPHIC COLOR PROCESSES
Filed Aug. 29, 1931  2 Sheets-Sheet 1
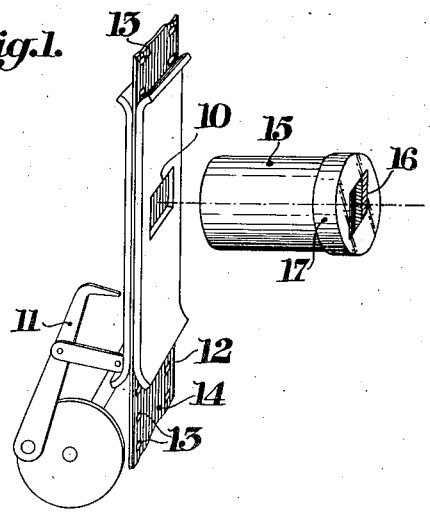
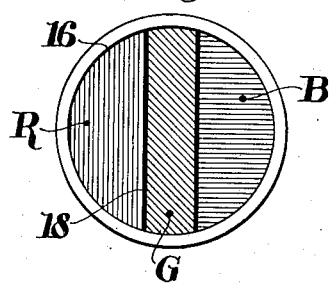
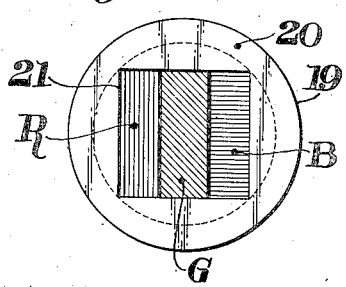
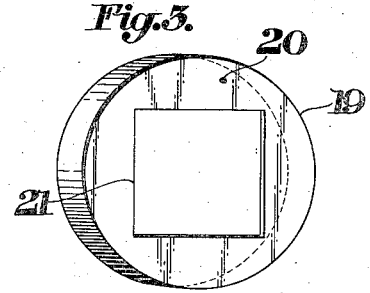
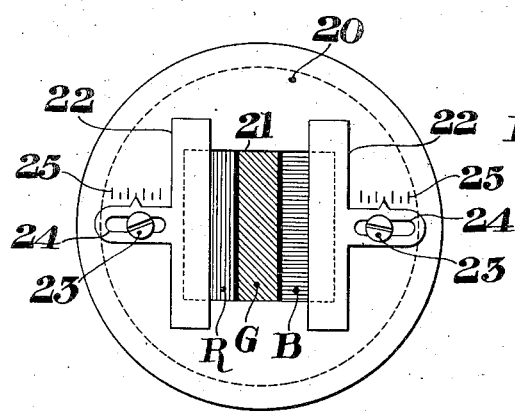
Inventor:
Edwin C. Fritts,
By Newton M. Perrins
Rolla N. Carter
Attorneys June 6, 1933.  E. C. FRITTS  1,912,700
APPARATUS FOR PHOTOGRAPHIC COLOR PROCESSES
Filed Aug. 29, 1931   2 Sheets-Sheet 2
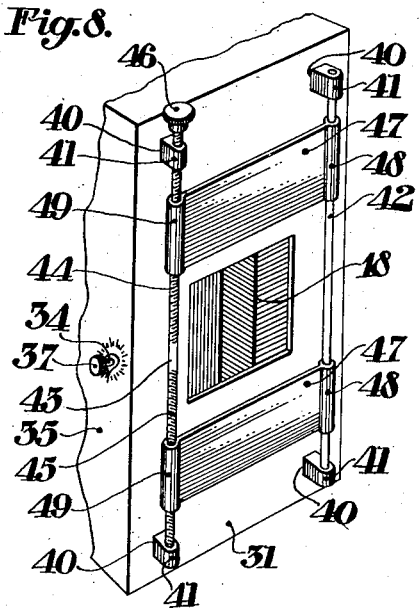
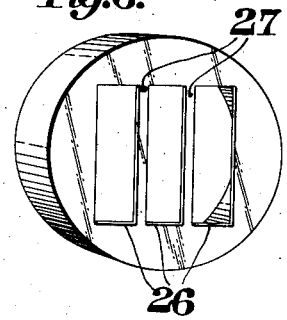
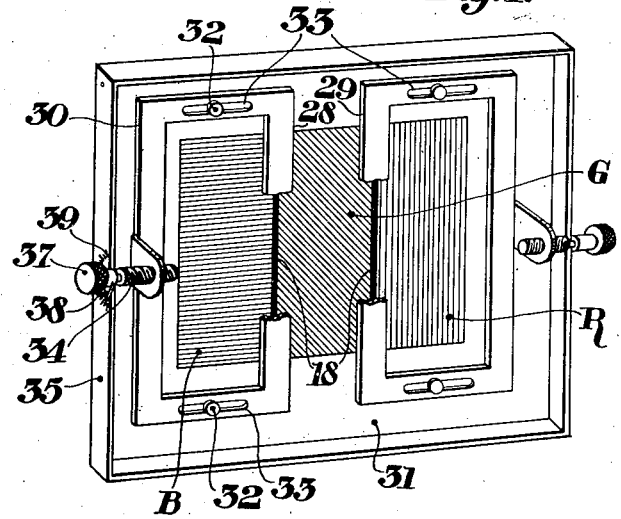
Inventor:
Edwin C. Fritts,
By Newton M. Perrins
Holla N. Carter
Attorneys Patented June 6, 1933

1,912,700

UNITED STATES PATENT OFFICE

EDWIN C. FRITTS, OF ROCHESTER, NEW YORK, ASSIGNOR TO EASTMAN KODAK COMPANY, OF ROCHESTER, NEW YORK, A CORPORATION OF NEW YORK

APPARATUS FOR PHOTOGRAPHIC COLOR PROCESSES

Application filed August 29, 1931. Serial No. 560,168.

This invention relates to color processes, and particularly to improvement in the process described in the patent to Berthon, #992,151, granted May 15, 1911, involving the use of a photographic support having a surface with microscopic lens elements thereon and of a polychromatic screen associated with the objective.

In the above color photography process the color screen is preferably in the form of a series of colored filter bands arranged in parallel relation. For many purposes it is desired to vary the exposure by varying the diaphragm opening of the objective and to adjust the color ratio of the screen to correspond to the color sensitivity of the particular emulsion being used, or to obtain special color effects by repression of one or two constituent colors.

It is an object of this invention to provide adjustable means for varying the diaphragm opening in such a system and also to provide adjustable means for controlling the color ratio between the several colored filter bands. This and other objects and advantages are obtained by selectively adjusting the width of the several colored filter bands of the screen to control the color ratio and by uniformly adjusting the length of the color bands to control the exposure.

Other objects and advantages of this invention will be more fully understood from the following description when read in connection with the accompanying drawings in which the same reference characters denote the same parts throughout and in which, Fig. 1 is a diagrammatic showing of a system with which my invention is useful;

Fig. 2 is a front view of a screen used in the process;

Fig. 3 is a perspective view of a mask adapted for use with the screen;

Fig. 4 is a front view of the mask and screen together;

Fig. 5 is a front view of an adjustable mask of the type shown in Fig. 4;

Fig. 6 is a perspective view of a modified form of mask;

Fig. 7 is a perspective view of an adjustable mask of the type shown in Fig. 6;

Fig. 8 is a perspective view of a light adjusting unit used with the masked screen.

In Fig. 1 there is shown in a diagrammatic way a motion picture gate 10 past which is drawn by a pull down mechanism indicated conventionally at 11 a sensitized film 12 having perforations 13 and microscopic longitudinal ridges or semi-cylinders 14 on that surface facing an objective in the mount 15 associated with which, and here shown as in front, is a polychromatic screen 16 carried by a suitable cap 17.

One form of screen 16 which may be used is shown in Fig. 2 and comprises three color fields R, G, and B of nearly equal areas with straight boundaries 18 between them. For the purpose of this description these color fields are considered as being red, green and blue, respectively.

In order to compensate for variations in the color sensitivity of the emulsion used or to obtain special color effects, I provide an adjustable mask or a series of masks for varying the effective widths of the several color bands. Since the cutting down of the width of the color bands alters only the area of emulsion exposed behind each cylindrical element and not the amount of light falling on the area actually exposed, I provide means for varying the aperture or exposure by varying the effective lengths of the colored filter bands.

When two parallel jaws moving in front of and from the top and bottom of the filter bands of the screen are employed for adjusting the exposure, it is necessary that the filter band be rectangular and of the same length. Such an exposure controlling device is described and claimed in U. S. Patent 1,813,691 issued July 9, 1931 to Otto Wittel.

In Fig. 3 is shown one of these masks in the form of a cap 19 having an opaque mask 20 provided with a rectangular diaphragm opening 21 and suitable for use with the above-mentioned exposure controlling device. Fig. 4 is a front view of the mask mounted over the screen. In this form the opening 21 is rectangular, the sides of which may be made to cut to a greater or less extent into the outer color bands R and B.

The width of the middle band G would always be the same and bear the proper relation to the full width of the bands R and B as required by the emulsion of the greatest green sensitivity to be encountered. Ratio caps of this type are very inexpensive and in practice a cap providing the proper color ratio will be furnished with each roll of film, or for special color effects a series of such masks could be furnished giving a definitely rated series of color ratios.

In Fig. 5 the width of the rectangular mask opening 21 is adapted to be adjusted to obtain any desired color ratio by properly positioning the opaque strips 22 to selectively vary the effective widths of either the red or blue color bands. These strips are held in position by set screws 23 and the slot 24 permits adjustment in a direction perpendicular to the color bands. Suitable scales 25 may be provided to facilitate the accurate positioning of the strip 22. It is obvious that the making of the strips 22 separately adjustable makes it possible to obtain within limits any desired ratio between the widths of the various color bands.

Instead of having a single rectangular opening the mask may be provided with rectangular windows 26, one for each color band, separated by opaque strips 27 adapted to coincide with the boundaries 18 between the several color bands R, G, and B. As in the case of the mask shown in Fig. 4, the length of the color bands is constant and their widths are varied to vary the color ratio of the mask. Here again it will be necessary to furnish a series of masks to provide a series of different color ratios.

In Fig. 7 I have shown a mask provided with opaque strips 28 and 29 in registry with the boundary lines 18 between the color bands. By making these strips separately adjustable they may be moved out of registry with the lines 18 to vary the effective widths of one or more color bands as well as the ratio between the widths of the bands. For example, if it is desired to decrease the width of the red band R and to increase the width of the green band G, while leaving the blue band B unaltered, the strip 28 will be moved to the left as shown in Fig. 7 until the green band has been widened the desired amount and the width of the red has been sufficiently reduced. Any movement of the strip 29 to the right or left will vary the ratio between the width of the bands G and B and by properly adjusting the positions of the strips 28 and 29 any desired ratio, within limits, between the widths of the bands may be obtained.

Any suitable arrangement may be utilized for adjusting these, and one such arrangement is shown in Fig. 7. The arrangement for each strip is the same and the description will be limited to the means for adjusting the strip 28. The strip 28 forms one side of a rectangular frame 30 held in contact with the filter plate 31, which may be a portion of the camera box, by headed studs 32 passing through slot 33 and mounted in the plate 31. The slots 33 permit movement of the frame 30 in a direction perpendicular to the boundary lines 18. Such movement is controlled by turning a threaded rod 34 mounted in the wall 35 of the camera box 31 or any other suitable part stationary relatively to the color bands R, G and B. The rod 34 has a threaded engagement with an upturned ear 36 on the frame 30 and upon turning the rod by means of a knurled head 37 the frame 30 may be made to move to the right or to the left as shown in Fig. 7. The rod 34 may be provided with a pointer 38 for indicating on a suitable scale 39 the position of the strip 28 relative to the boundary line 18.

Although the above-described masks or ratio caps may be used by themselves where it is desired only to vary the ratio between the several color bands, this invention contemplates their use in conjunction with an exposure modifying device which may be of the type disclosed in the above identified application of Otto Wittel, or may take the form shown in Fig. 8 where a portion of the camera box 31 is shown having a rectangular screen provided on its underneath side, i. e. behind the plane of the drawing, with an adjustable mask of the type shown in Fig. 7, although any of the masks herein described may be used with equally satisfactory results. Carried on the front of the camera are lugs 40, carrying eyes 41 through which pass rods 42 and 43. The rod 43 is reversely screw threaded at 44 and 45 and has a knurled head 46 by which it may be turned. Masking members 47 have at one end eyes 48 slidably engaging the rod 42 and at the other end internally threaded sleeves 49 engaging the threaded portions of the rod 43 and adapted to be moved in opposite directions thereby when the head 46 is turned. These sliding leaves constitute a diaphragm or mask member adapted to shut off light from the color bands uniformly to give the desired exposure, yet preserving the color ratio determined by the ratio cap used or the adjustment of the opaque strips when masks of the type shown in Figs. 5 and 7 are used.

It is to be noted that in all of the forms shown, the particular mask chosen is one that varies only the effective width of the color bands to vary the color ratio of the screen and that a separate attachment is used for varying the diaphragm to control the exposure as desired. Where in the claims the word "mask" is used, it is to be understood that it means that the areas referred to permit light to pass.

Although I have illustrated and described my invention as applied to a camera for picture taking, it is obviously equally applicable in the projection of the images. With all of the forms it is to be understood that the lineal microscopic elements are parallel to the color bands in the screen; and that by lineal I include the known types which extend as lines, ridges, or partial cylinders.

Various modifications of my invention will readily suggest themselves to persons skilled in this art without departing from the scope of my invention as set forth in the appended claims.

What I claim as new and desire to secure by Letters Patent of the United States is:

1. A light obstructing diaphragm for use in a color process with a screen having a series of parallel color bands and having means for varying the effective widths of the several color bands.

2. In combination in an optical system for use in a color process, a color screen and a light obstructing device, the color screen comprising three differently colored light transmitting areas and the light obstructing device being adjustable for varying the effective widths of the areas of the screen.

3. A light obstructing diaphragm for use in a color process with a screen having a series of parallel color bands and having means for varying both the effective relative widths of the several color bands and for varying the effective lengths of the several color bands.

4. A light obstructing diaphragm for use in a color process with a screen having a series of parallel color bands, and having means for varying the effective widths of the several color bands and having separate means for varying the effective lengths of the several color bands.

5. In a light controlling device for photography, the combination with an attachment for objectives having a rectangular light opening therein, of means carried by the attachment for selectively varying both dimensions of the opening.

6. A light obstructing diaphragm for use in a color process with a screen having a series of parallel color bands, and having a single rectangular opening two sides of which are parallel to the color bands and are adjustable in a direction perpendicular to said color bands.

7. A color ratio cap for use in a color process with a screen having a series of parallel color bands and having a separate rectangular opening for each of the color bands, the rectangular openings being parallel to one another and having individual widths in a ratio corresponding to the color ratio desired in the process.

8. In combination, in an optical system for use in a color process, a color screen and a light obstructing device, the color screen comprising distinct, differently colored, light transmitting areas and the light obstructing device having a separate rectangular light transmitting area corresponding in position to each of said areas, the width of each separate rectangular area being such that the amounts of light permitted to pass to said areas of said screen respectively correspond with the ascertained requirements of the process.

9. The combination with an optical system for use in a color motion picture process and including an exposure field for a photographic layer having numerous microscopic lenticular elements associated therewith, an objective and a polychromatic screen having distinct, differently colored, parallel light-transmitting areas, of a light obstructing device positioned in the path of light traversing the objective and screen to the field and having means for varying the effective widths of said parallel transmitting areas, and separate means for uniformly varying the lengths of said light transmitting areas.

10. The method of diaphragming photographic objectives provided with parallel banded polychromatic screens for lenticular film comprising varying the lengths of all the bands to control the exposure and varying the effective relative widths of the several bands to control the color ratio of the screen.

11. The method of diaphragming photographic objectives provided with parallel banded polychromatic screens for lenticular film comprising uniformly varying the lengths of the bands and selectively varying the effective widths of the bands.

Signed at Rochester, New York this 26 day of August 1931.

EDWIN C. FRITTS.